United States Patent
Yamada et al.

(10) Patent No.: US 6,944,696 B2
(45) Date of Patent: Sep. 13, 2005

(54) DATA PROCESSING PROCESSOR (75) Inventors: Hiroshi Yamada, Higashimurayama (JP); Toyokazu Hori, Kodaira (JP); Masaru Hase, Kokubunji (JP); Tetsuya Yamato, Tachikawa (JP); Norihiko Sugita, Kodaira (JP)

(73) Assignee: Renesas Technology Corp., Tokyo (JP)

( * ) Notice: Subject to any disclaimer, the term of this patent is extended or adjusted under 35 U.S.C. 154(b) by 0 days.

(21) Appl. No.: 10/673,851

(22) Filed: Sep. 30, 2003

(65) Prior Publication Data
US 2004/0073731 A1 Apr. 15, 2004

Related U.S. Application Data (63) Continuation of application No. 09/745,928, filed on Dec. 26, 2000, now Pat. No. 6,658,511.

(30) Foreign Application Priority Data

Dec. 27, 1999 (JP) ............................................ 11-368800

(51) Int. Cl.[7] .............................................. G06F 13/36
(52) U.S. Cl. ...................................... 710/107; 710/113
(58) Field of Search ............................. 710/36, 40, 45, 710/107, 113–125, 309, 240–244; 709/238, 244

(56) References Cited

U.S. PATENT DOCUMENTS

| | | | | |
|---|---|---|---|---|
| 5,016,162 A | * | 5/1991 | Epstein et al. ............... | 710/242 |
| 5,105,424 A | | 4/1992 | Flaig et al. | |
| 5,113,491 A | * | 5/1992 | Yamazaki ..................... | 345/441 |
| 5,512,918 A | * | 4/1996 | Forrest et al. ............... | 345/473 |
| 5,752,266 A | * | 5/1998 | Miyawaki et al. ........... | 711/158 |
| 5,767,866 A | * | 6/1998 | Chee et al. ................... | 345/535 |
| 5,862,353 A | | 1/1999 | Revilla et al. | |
| 5,884,051 A | * | 3/1999 | Schaffer et al. ............. | 710/107 |
| 6,026,455 A | | 2/2000 | Shah et al. | |
| 6,034,542 A | | 3/2000 | Ridgeway | |
| 6,070,205 A | * | 5/2000 | Kato et al. ................... | 710/100 |
| 6,240,475 B1 | | 5/2001 | Anubolu | |
| 6,505,265 B1 | | 1/2003 | Ishikawa et al. | |
| 6,658,511 B2 | * | 12/2003 | Yamada et al. .............. | 710/107 |

FOREIGN PATENT DOCUMENTS

| | | | | |
|---|---|---|---|---|
| EP | 0867814 A2 | 9/1998 | | |
| JP | 3-263158 | 11/1991 | | |
| WO | WO 9641325 A1 | * 12/1996 | ............ | G09G/1/16 |

* cited by examiner

*Primary Examiner*—Paul R. Myers
(74) *Attorney, Agent, or Firm*—Mattingly, Stanger, Malur & Brundidge, P.C.

(57) ABSTRACT

A bus arbitration apparatus for an image processing processor is operable such that when a channel having a high necessity of a real-time processing operation issues a bus use request, a bus use permission is not given to another channel having a low necessity of a real-time processing operation. The bus arbitrator of the data includes a timer for counting down use permission time with respect to the channel having the high necessity of the real-time processing operation, and a register for the channel having the low necessity of the real-time processing operation. A value larger than a maximum value of the timer is set to the value of the register. In the bus arbitration, the value of the register is compared with that of the timer, and then the bus use permission is given to a channel having the small value.

4 Claims, 5 Drawing Sheets

DATA PROCESSING PROCESSOR

This is a continuation application of U.S. Ser. No. 09/745,928, filed Dec. 26, 2000 now U.S. Pat. No. 6,658,511.

BACKGROUND OF THE INVENTION

The present invention generally relates to a data processing processor, and more specifically, relates to a data processing processor containing a bus arbitrating apparatus capable of selecting one channel with respect to bus access requests issued from a plurality of channels.

Figure 3:
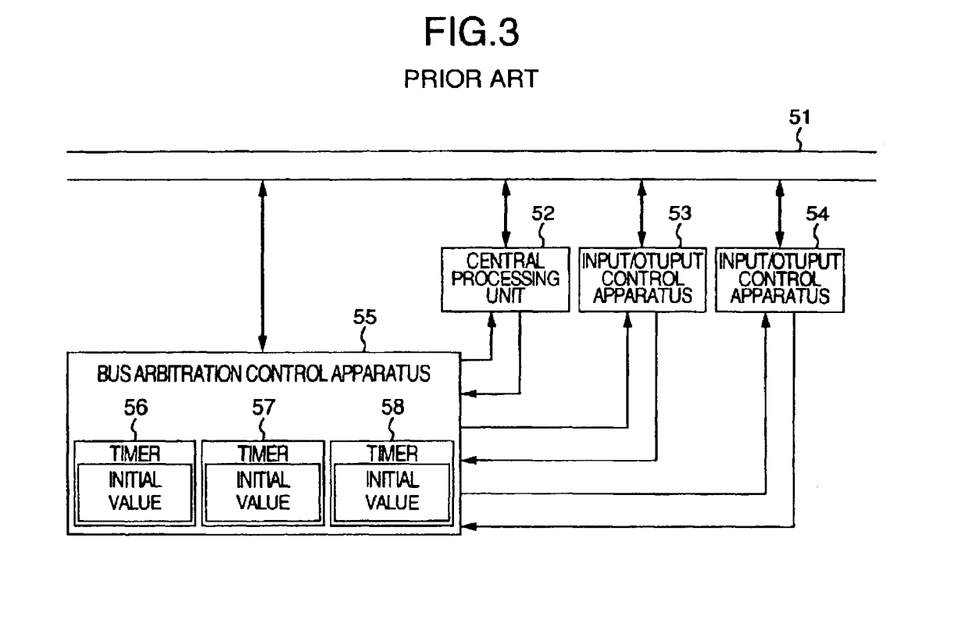
FIG. 3 is a schematic block diagram for indicating the arrangement of the prior art bus arbitration apparatus.

Conventionally, as a bus arbitration control scheme for selecting one apparatus in response to bus use requests issued from a plurality of apparatuses to allow the selected apparatus to use the bus, one conventional bus arbitration control system is described in JP-A-3-263158. FIG. 3 schematically shows a major arrangement of this conventional bus arbitration control system. That is, as shown in FIG. 3, an information processing apparatus is arranged by a bus 51 used to commonly transfer information; at least two sets of apparatuses having bus control functions, for example, bus masters such as a central processing unit 52, and input/output control apparatuses 53/54; and a bus arbitration control apparatus 55. The bus arbitration control apparatus 55 of this conventional information processing apparatus owns such a control function. That is, in this conventional information processing apparatus, at least one timer 56, 57, 58, and a storage unit for storing thereinto an initial value of this timer are provided every bus master in the bus arbitration control apparatus 55. The bus acquisition waiting allowable time for each of the bus masters is stored in each of the storage units. When bus use requests are notified from the bus masters to the bus arbitration control apparatus 55, the countdown operations of the timers 56, 57, 58, for the relevant bus masters are commenced. When the bus is brought into usable condition, in such a case that at least two bus use requests are issued from the bus masters, while the respective timer values for the bus masters are compared with each other, this bus arbitration control apparatus 55 allows such a bus master having a minimum count value of a timer to use the bus, and also stops the count-down operation of the timer for the bus master which is allowed to use the bus so as to return the count value to the initial value. As a result, the bus use priority degrees for the respective bus masters are automatically increased in connection with such a fact that the bus acquisition waiting time of the respective bus masters is prolonged, so that the bus arbitration suitable for the respective bus masters can be controlled in a proper manner.

SUMMARY OF THE INVENTION

In the above-described conventional bus arbitration control scheme, since the value of the timer is counted down until the base use permission is given to the bus master which has issued the bus use request, when such a bus master which has been once connected to the bus again issues the buss access request, this bus master is positioned to the lowest priority order, or the priority order nearly equal to this lowest priority order. As to this point, such an example that two bus masters issue bus use requests will now be simply explained with reference to FIG. 4.

Figure 4:
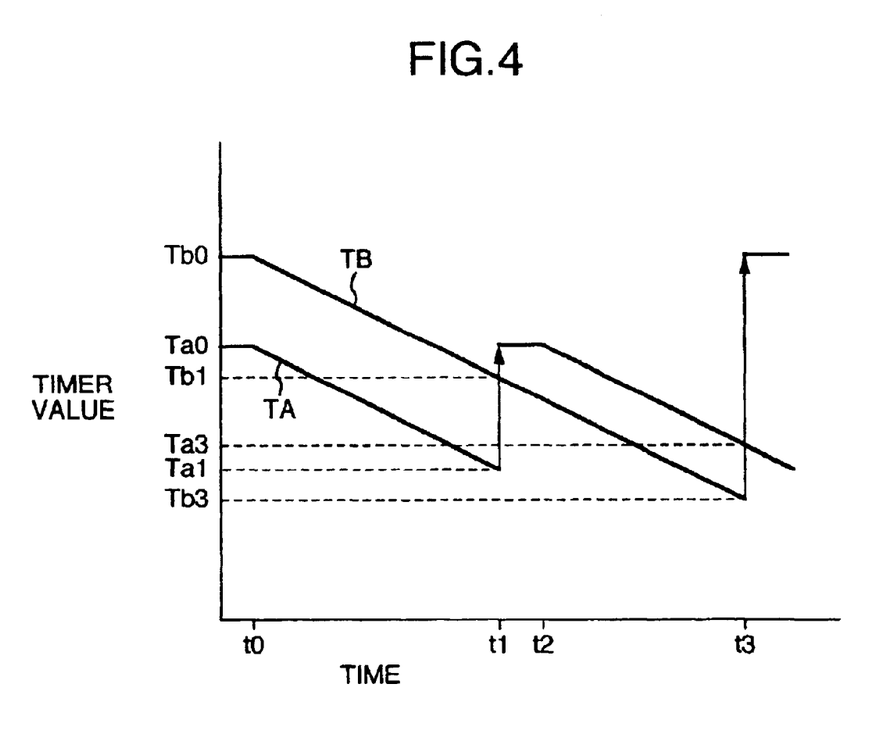
FIG. 4 is an explanatory diagram for explaining an example of timer operation timing in the conventional bus arbitration apparatus.

In FIG. 4, it is so assumed that symbol "TA" shows a timer of a bus master "A" having a high priority order, symbol "TB" indicates a timer of a bus master "B" having a low priority order, and initial set values of the respective timers "A" and "B" are selected to "Ta0" and "Tb0." It is also assumed that at a time instant "t0", the count-down operations of these timers TA and TB are commenced in response to the bus use requests issued from the bus masters "A" and "B", and at a time instant "t1", the bus is brought into the usable condition. At this time, since values "Ta1" and "Tb1" of the respective timers TA and TB own such a relationship of Ta1<Tb1, the bus arbitration control apparatus issues the bus use permission with respect to the bus master A having the high priority order, and resets the value of the timer TA to the initial value "Ta0." On the other hand, the count-down operation of the timer TB of the bus master B having the low priority order is continued.

Furthermore, the following assumption is made. That is, before the bus use permission is issued to the bus master B, the bus master A again issues the bus use request and the timer TA starts the count-down operation at a time instant "t2", and thereafter, the bus is brought into the usable condition at another time instant "t3." In this case, values "Ta3" and "Tb3" of the respective timers TA and TB become such a relationship of Ta3>Tb3 at the time instant "t3." That is, since the relationship of Ta3>Tb3 is reversed with respect to the above-described relationship of Ta1<Tb1, although the bus master A having the high priority order issues the bus use request, the bus arbitration control apparatus would issue the bus use permission with respect to the bus master B having the low priority order.

As a result, when the above-explained conventional bus arbitration control scheme is applied to such a data processing processor having a plurality of channels and capable of processing image data, although such a channel having a high necessity of a real-time processing operation issues a bus use request, the bus arbitration control apparatus allows another channel having a low necessity of a real-time processing operation to use the bus. Accordingly, this conventional bus arbitration control scheme has such a problem that the image data processing operation would fail.

As a consequence, an object of the present invention is to provide a data processing processor equipped with a bus arbitration apparatus. This bus arbitration apparatus is operated in such a manner that while a channel having a high necessity or a high priority order of a real-time processing operation issues a bus use request, this bus arbitration apparatus does not allow another channel having a low necessity or a low priority order of a real-time processing operation to use the bus.

It should be noted in this specification that such an interface portion provided in the data processing processor is referred to as a "channel." This "channel" may interface between an external storage apparatus such as a DRAM and an SDRAM (synchronous DRAM) into which process data is stored, and a peripheral apparatus for transmitting/receiving data via a bus between this data processing processor and the own peripheral apparatus. For instance, in such a data processing processor for processing image data, the following units employed in the data processing processor will be referred to as "channels" hereinafter, namely, an interface unit for interfacing between a host CPU and the own data processing processor, a video input unit for capturing an MPEG (Moving Picture Coding Experts Group) image and an external input image, a display unit for synthesizing the images with each other to output the synthesized image to an external unit, and the like.

To solve the above-explained problem, a data processing apparatus, according to the present invention, is featured in that in a data processing processor having a bus arbitration apparatus for selecting one channel in response to bus use requests issued from a plurality of channels to thereby allow this selected channel to use the bus, the bus arbitration apparatus is comprised of:

a timer for changing count time in the case that a bus use request is notified to a channel having a high necessity of a real-time processing operation, namely a timer for counting down, or counting up a count value of the timer; and a register for setting the count time of said timer with respect to a channel having a low necessity of a real-time processing operation, namely a register for setting a value larger than a maximum value of the count time in the case of the timer for counting down the count value thereof, or for setting a value smaller than a minimum value of the count time in the case of the timer for counting up the count value thereof; and the bus arbitration apparatus executes a bus arbitration by comparing the values of the respective timers with the values of the register and by controlling to allow the channel having the small value to use the bus when the timer counts down the count value, and by controlling to allow the channel having the large value to use the bus when the timer counts up the count value of the timer.

Also, in the above-described data processing processor, instead of the register employed in the bus arbitration apparatus, such a timer for stopping a count change based upon a value larger than, or smaller than an initial value of the count value of the timer with respect to the channel having the high necessity of the real-time processing operation may be provided with respect to the channel having the low necessity of the real-time processing operation.

Also, the data processing processor is arranged by a CPU interface unit used to transmit/receive a signal between a host CPU and the own data processing processor; an image processing unit for processing an on-screen display operation and a 2-dimensional graphic calculating operation; a video input unit for capturing an external input image; a display unit for synthesizing images with each other to output a synthesized image to an external unit; and a memory interface unit used to transmit/receive a signal between an external storage apparatus and the own data processing processor. In this data processing processor, in such a case that the bus arbitration apparatus is provided in the memory interface unit, the above-explained channel having the high necessity of the real-time processing operation corresponds to the respective channels of the CPU interface unit, the image processing unit, and the display unit, whereas the channel having the low necessity of the real-time processing operation corresponds to the respective channels of the video input unit, and the memory interface unit.

Also, the external storage apparatus is either a DRAM or an SDRAM. Preferably, a refresh operation requesting circuit may be provided in the memory interface unit. This refresh operation requesting circuit produces such a request signal used to execute the refreshing operation of either the DRAM or the SDRAM for a time period during which the display unit does not request the use of the bus.

Also, the bus corresponds to such a data bus connected between the external storage apparatus and the memory interface unit. This data bus may be connected via the memory interface unit having the bus arbitration apparatus to the respective channels.

A data processing processor, according to the present invention, is featured in that in a data processing processor having a bus arbitration apparatus for selecting one channel in response to bus use request issued from a plurality of channels to thereby allow this selected channel to use the bus, the bus arbitration apparatus is comprised of:

a timer for changing a timer count value in the case that a bus use request is notified to a channel having a high priority order, namely a timer for counting down, or counting up a count value thereof; and a register for setting a value larger than a maximum value of the count time, or for setting a value smaller than a minimum value of the count time with respect to a channel having a low priority order. The bus arbitration apparatus executes a bus arbitration control operation by comparing the values of the respective timers with the values of the register and controlling to allow the channel having the small value (or large value) as a result of the comparison to use the bus.

Also, in the above-described data processing processor, instead of the register employed in the bus arbitration apparatus, such a timer for stopping a count change based upon a value larger than, or smaller than an initial value of the count time of the timer provided with the channel having the high priority order may be provided with respect to the channel having the low priority order.

Other objects, features, and advantages of the present invention will become apparent from the description of the following embodiments of the present invention taken in conjunction with the accompanying drawings.

DETAILED DESCRIPTION OF THE EMBODIMENTS

A data processing processor, according to a embodiment of the present invention, is arranged as follows:

In a bus arbitration apparatus employed in the data processing processor, a timer for counting down use permission time as provided with such a channel having a high necessity of a real-time processing operation, whereas a register is provided with such a channel having a low necessity of a real-time processing operation. A value larger than a maximum value of the timer is set to the value of this register. Alternatively, the value larger than the maximum value of the timer is set as an initial value to the channel having the low necessity of the real-time processing operation, and furthermore, such a timer is provided with this channel having the low necessity of the real-time processing operation, the count-down operation of which is stopped before the maximum value of the timer is reached.

With employment of the above-explained arrangement, while the bus arbitration is carried out, the bus arbitration apparatus compares the timer count value of the channel having the high necessity of the real-time processing operation with either the register value or the timer count value of the channel having the low necessity of the real-time processing operation. Since the bus arbitration apparatus allows such a channel having the smallest value to use the bus, the data processing processor can be operated in such a manner that the channel having the low necessity of the real-time processing operation is not allowed to use the bus, while the channel having the high necessity of the real-time processing operation issues the bus use request.

Figure 5:
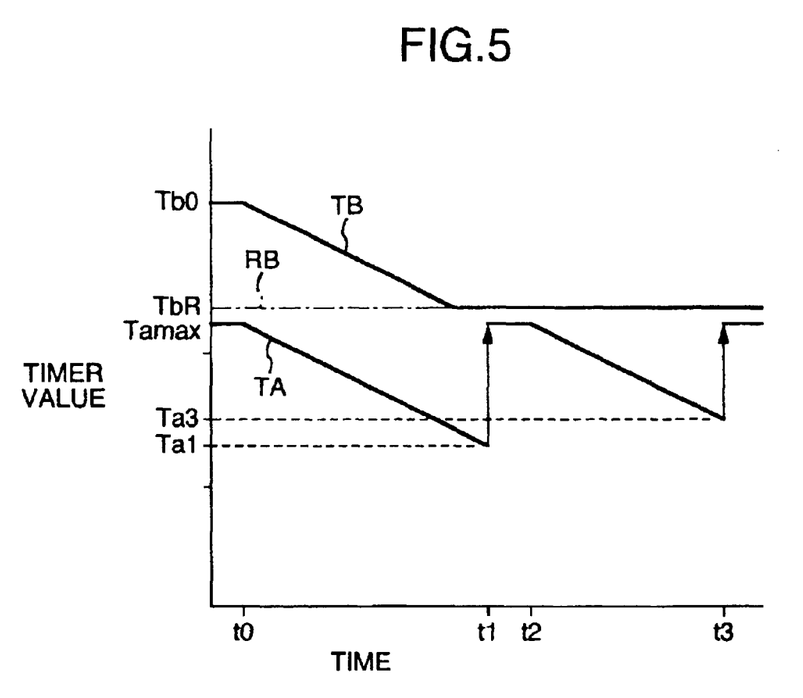
FIG. 5 is a graphic representation for graphically showing an example of timing operations between a register and a timer operable in a count-down mode, which are provided in a bus arbitration apparatus of the data processing processor according to the present invention.

With respect to this processor operation, a brief description thereof will now be made with reference to FIG. 5. In FIG. 5, symbol "TA" shows a count value of a count-down timer employed in a channel "A" having a high necessity of a real-time processing operation, and symbol "RB" represents a register provided in a channel "B" having a low necessity of a real-time processing operation. In this case, a set value "TbR" of the register "RB" is set to be such a value larger than a maximum value "Tamax" (also corresponding to initial value of timer "A") of the timer "A." At a time instant "t0", when both the channel A and the channel B issue bus use requests, the timer A commences the count-down counting operation thereof. It is now assumed that the bus is brought into the bus usable condition at a time instant "t1". At this time, since a relationship between a count value "Ta1" of the timer TA and the set value "TbR" of the register RB is defined as Ta1<TbR, the bus arbitration apparatus issues a bus use permission with respect to the channel A having the high necessity of the real-time processing operation, and resets the count value of the timer TA to the initial value Tamax. On the other hand, the register RB employed in the channel B having the low necessity still keeps the set value TbR.

Furthermore, while the bus use permission is not yet given to the channel B, it is now assumed that the channel A again issues the bus use request, and the timer TA starts the count-down operation thereof at a time instant t2, and the bus is brought into the bus usable condition at a time instant t3. At this time instant t3, a relationship between a count value "Ta3" of the timer TA and the value TbR of the register RB is defined by Ta3<TbR, which is different from the relationship with employment of the conventional bus arbitration control scheme as indicated in FIG. 4. That is, this relationship obtained at the step t3 is not reversed with respect to the first-mentioned relationship obtained at the time instant t1. As a consequence, the bus arbitration apparatus issues the bus use permission to the channel A having the high necessity of the real-time processing operation.

Also, instead of the register RB, even when such a timer TB is employed, the same result may be achieved. The count-down operation of the timer TB is stopped based upon the resister value TbR larger than the initial value Tamax of the timer TA employed in the channel A having the higher necessity of the real-time processing operation, as shown in FIG. 5.

As a consequence, the above-explained problem never occurs, in which the image processing operation would become a failure in the case that the channel which is once connected to the bus again issues the bus use access.

It should be understood that the present invention may be similarly applied to such a case that a count-up timer is employed in a channel having a high necessity of a real-time processing operation. In this alternative case, the bus arbitration apparatus may give a bus use permission to such a channel having a larger count value of a timer.

Figure 6:
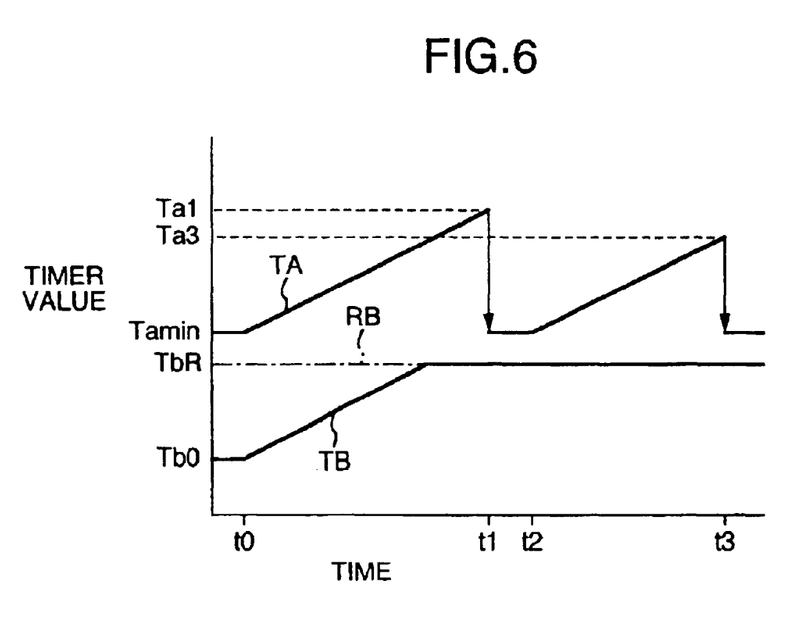
FIG. 6 is a graphic representation for graphically showing an example of timing operations between a register and a timer operable in a count-up mode, which are provided in a bus arbitration apparatus of the data processing processor according to the present invention.

Referring now to FIG. 6, an operation of a data processing processor will be simply explained in the case that the timer performs the count-up operation. In FIG. 6, symbol "TA" shows a count value of a count-up timer employed in a channel "A" having a high necessity of a real-time processing operation, and symbol "RB" represents a register provided in a channel "B" having a low necessity of a real-time processing operation.

In this case, a set value "TbR" of the register "RB" is set to be such a value smaller than a minimum value "Tamin" (also corresponding to initial value of timer "A") of the timer "A." At a time instant "t0", when both the channel A and the channel B issue bus use requests, the timer A commences the count-up counting operation thereof. At a time instant "t1", it is now assumed that the bus is brought into the bus usable condition. At this time, since a relationship between a count value "Ta1" of the timer TA and the set value "TbR" of the register RB is defined as Ta1>TbR, the bus arbitration apparatus issues a bus use permission with respect to the channel A having the high necessity of the real-time processing operation, and resets the count value of the timer TA to the initial value Tamin. On the other hand, the register RB employed in the channel B having the low necessity still keeps the set value TbR.

Furthermore, while the bus use permission is not yet given to the channel B, it is now assumed that the channel A again issues the bus use request, and the timer TA starts the count-up operation thereof at a time instant t2, and the bus is brought into the bus usable condition at a time instant t3. At this time instant t3, a relationship between a count value "Ta3" of the timer TA and the value TbR of the register RB is defined by Ta3>TbR, which is different from the relationship with employment of the conventional bus arbitration control scheme as indicated in FIG. 4. That is, this relationship obtained at the time instant t3 is not reversed with respect to the first-mentioned relationship obtained at the time instant t1. As a consequence, the bus arbitration apparatus issues the bus use permission to the channel A having the high necessity of the real-time processing operation.

Also, instead of the register RB, even when such a timer TB is employed, the same result may be achieved. The count-up operation of the timer TB is stopped based upon the resister value TbR smaller than the initial value Tamin of the timer TA employed in the channel A having the higher necessity of the real-time processing operation, as shown in FIG. 6.

Next, a detailed description will now be made of a concrete example of the data processing processor according to the present invention with reference to the accompanying drawings.

[Embodiment 1]

Figure 1:
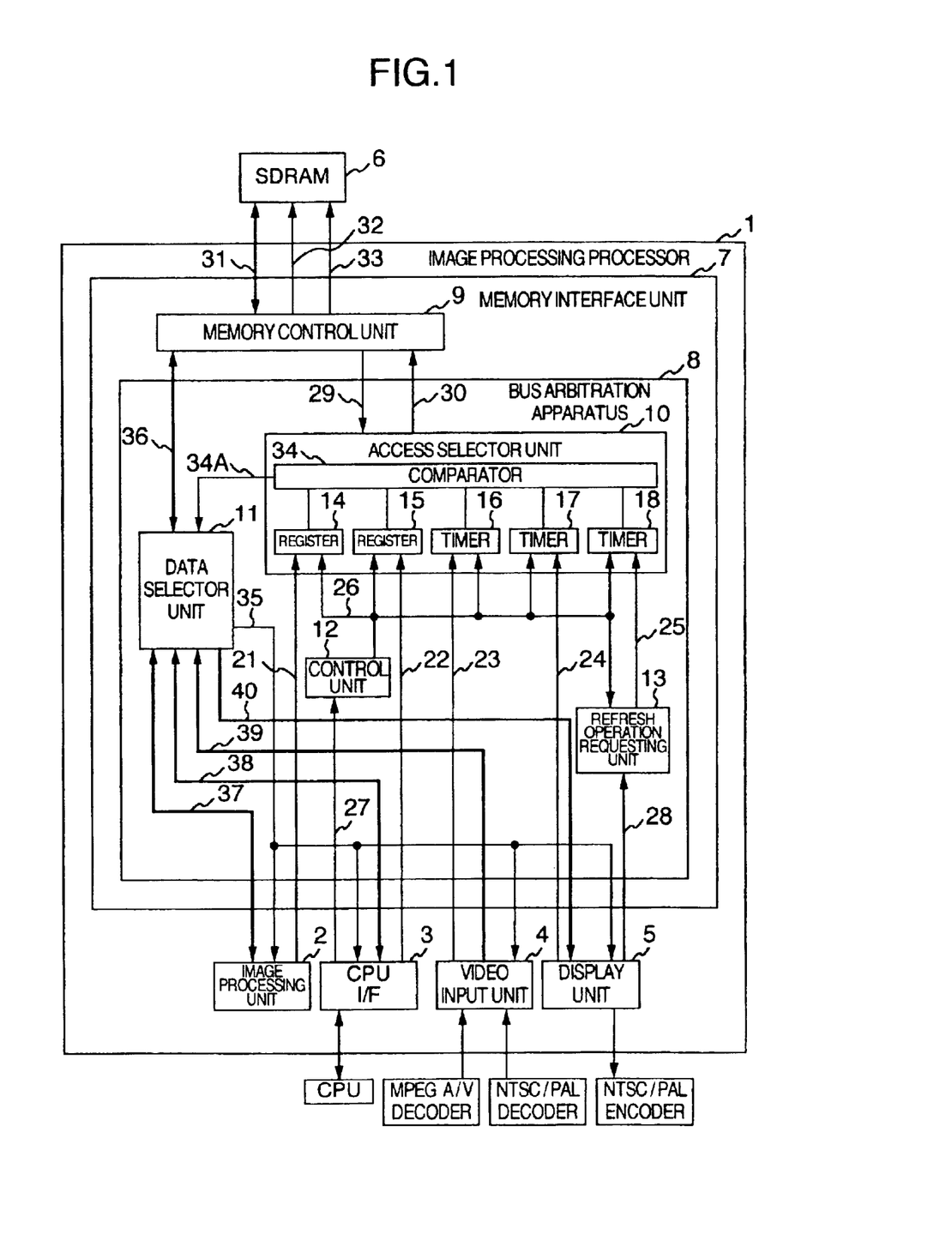
FIG. 1 is a schematic block diagram for showing a data processing processor according to an embodiment of the present invention.

FIG. 1 is a schematic block diagram for showing an arrangement of a data processing processor according to an embodiment of the present invention. In FIG. 1, reference numeral 1 indicates a data processing processor for processing image data. This data processing processor 1 will be referred to as an "image processing processor" hereinafter. This image processing processor 1 is constituted by an interface (CPU I/F) unit 3 for interfacing a host CPU, an image processing unit 2, a video input unit 4, a display unit 5, and a memory interface unit 7. The image processing unit 2 executes both an on-screen display (OSD) process operation and a two-dimensional graphic calculation (line drawing, and bit block operation). The on-screen display (OSD) processing operation corresponds to a function capable of displaying a program guide on a television screen in a superimpose manner. The video input unit 4 captures an MPEG input image supplied from an externally provided MPEG A/V decoder, and also captures an external input image supplied from an NTSC/PAL decoder. The display unit 5 synthesizes images with each other to thereby output a synthesized image to an externally-provided NTSC/PAL encoder. The memory interface unit 7 interfaces between an SDRAM 6 connected to the image processing processor 1 and the own image processing processor 1.

The memory interface unit 7 includes a bus arbitration unit 8, and a memory control unit 9. The bus arbitration unit 8 arbitrates bus access requests, namely bus use requests issued from the above-described four channels (namely, image processing unit 2, host CPU interface unit 3, video input unit 4, and display unit 5). The memory control unit 9 transmits/receives a control signal 31, an address 32, and data 33 with respect to the SDRAM 6 which stores thereinto image process data.

The bus arbitration unit 8 includes a refresh operation requesting unit 13, a control unit 12, an access selector unit 10 containing a comparator 34, and also a data selector unit 11. In order that the refreshing operation of the SDRAM 6 is carried out for a time period during which the display unit 5 does not issue the bus use request, namely during a blanking period of a display device such as a cathode-ray tube (CRT) and a liquid crystal dismay (LCD), this refresh operation requesting unit 13 issues a bus use request signal 25 in response to a signal value of an access frequent degree control signal 26 entered from an access frequent degree control unit (will be simply referred to as a "control unit" hereinafter) 12. The control unit 12 controls count values of timers 16, 17, 18 and values of registers 14, 15, which correspond to the above-explained four channels and the refresh operation request unit 13. The access selector unit 10 compares the count values of the timers 16, 17, 18 with the values of the registers 14, 15 by the comparator 34, and selects such a channel having a minimum value as a bus use channel. The data selector unit 11 issues a bus use permission to the channel selected by the comparator 34 of the access selector unit 10, and performs a data transfer operation corresponding to the bus-use-allowed channel via data transfer lines 37, 38, 39, 40.

In this case, the data transfer mode control signal 27 supplied from the CPU I/F unit 3 corresponds to a signal which is used to set the respective initial values of the timers 16, 17, 18, and also the respective values of the registers 14 and 15 in response to a request issued from the host CPU. It should be noted that the setting operations of these values may be changed via the host CPU in response to, for example, an instruction of a user. Also, a display period signal 28 which is issued from the display unit 5 and then is inputted into the refresh operation requesting unit 13 corresponds to such a signal used to execute the refreshing operation of the SDRAM 6 during the blanking period of the display unit 5. This display period signal 28 is operated in such a manner that the value of this display period signal 28 is inverted as to the display period and the blanking period.

In this case, a simple explanation will now be made of a relationship between a time period during which the display unit 5 does not issue the bus use request (blanking time) and a time duration required for the above-described refreshing operation of the SDRAM 6.

Because of the nature specific to the SDRAM 6, plural times of such refreshing operations should be carried out within a predetermined time duration, the number of which is larger than, or equal to preselected times. The display unit 5 corresponds to such a channel having the highest necessity of the real-time processing operation. Therefore, while the display unit 5 performs the display operation, it is not preferable to obtain such a fact that other channels access the SDRAM 6. As a consequence, the refreshing operation is desirably carried out during the blanking time period of the display unit 5. While the display time period and the blanking time period alternately appear, the time duration during which the refreshing operation should be accomplished is longer than such a time duration defined by adding the display time period to the blanking time period. As a result, the refreshing operation may be completed within the blanking time period.

When the bus use request signals 23, 24, 25 are produced from the video input unit 4, the display unit 5, and the refresh operation requiring unit 13, while such a value which is set by the access frequent degree control signal 26 sent from the control unit 12 namely bus acquisition waiting permission time is used as an initial value, the timers 16, 17, 18 commence the count-down operations.

With respect to the bus use request signals 21 and 22 issued from the CPU I/F unit 3 and the image processing unit 2, different values from each other are set to the registers 14 and 15 in response to the access frequent degree control signal 26 sent from the control unit 12. At this time, the values set to the registers 14 and 15 are selected to be larger than such values larger than the maximum values of all of the timers 16, 17, 18. In the case that the bus use permission signal 29 is transmitted from the memory control unit 9 to the access selector unit 10, the bus arbitration apparatus 8 compares the respective count values of all of the timers 16, 17, 18 operated under bus use request condition with the respective values of all of the registers 14, 15 operated under bus use request condition, and then issues the bus use permission to such a channel having the smallest value. Then, a use permission channel notification signal 30 and another use permission channel notification signal 34A are outputted from the access selector unit 10 to the comparator 34 of the data selector unit 11 and the memory control unit 9.

It should also be noted that when the bus arbitration apparatus 8 performs the bus arbitration, if a plurality of the smallest timer values and a plurality of the smallest register values are produced, then the bus use permission is given to such a channel having the timers 16, 17, 18 whose initial values are the smallest values.

In the case that the values of the registers 14 and 15 are set to such values larger than the maximum values of the timers 16, 17, 18, there is no chance that the register values are made equal to the timer count values. In this case, there is a certain possibility that only the timer count values become the same values and also the smallest values.

On the other hand, in the case that the values of the registers 14 and 15 are set to such values which are smaller than the maximum values of the timers 16, 17, and 18, there is a certain possibility that the values of the registers 14 and 15 are equal to the timer count values. In this case, the following possibility may be established. That is, any one of the values of these registers 14 and 15 is made equal to the timer count value, and becomes the smallest value. This fact may be apparent from the following explanation. That is, since the timer count value is counted down, in the case that the initial value of the timer is set to become larger than the value of the register, the timer count value is made equal to the register value.

The fact as to whether or not the initial value of any one of these timers 16, 17, 18 is equal to the minimum value may be revealed from such an operation that the initial value of the timer is stored into the register.

In the case that such a channel which is allowed to use the bus has a timer, the count value of this timer is cleared to the initial value. A timer of such a channel which is not yet allowed to use the bus and further which issues the bus use request continuously performs the count-down operation. A channel which is allowed to access the bus inputs/outputs data of any one of the bus-access-allowed channels which are connected to the data transfer lines 37, 38, 39, 40 in response to a data enable signal 35 supplied from the data selector unit 11. Both the data of the bus-access-allowed channel, which is transferred from the data transfer line to the data selector unit 11, and the data of the SDRAM 6 are inputted/outputted via the internal data bus 36, the memory control unit 9, and the data bus 31.

In the above-explained operations, the timers 16, 17, 18 are provided in the channel having the high necessity of the real-time processing operation, whereas the registers 14, 15 are provided in the channel having the low necessity of the real-time processing operation, and also, the values larger than the maximum values of all of the timers 16, 17, 18 are set to the values of the registers 14 and 15. As a consequence, while the channel having the high necessity of the real-time processing operation issues the bus use request, the data processing processor can be operated in such a manner that the bus arbitration apparatus 8 does not allow the channel having the low necessity of the real-time processing operation to use the bus.

Also, in accordance with the arrangement of the data processing processor of this embodiment 1, when each of the channels receives the bus use permission issued from the bus arbitration apparatus, the data transfer to the bus is arranged to be connected to the data bus 31 via the data selector unit 11, the internal data bus 36, and the memory control unit 9, which are provided within the bus arbitration apparatus 8 so as to reduce the occupation areas of the data transfer lines 37 to 40. Alternatively, similar to the conventional bus arbitration system shown in FIG. 3, the data transfer line of the channel may be directly connected to the data bus in such a manner that when the respective channels receive the bus use permission, these channels may directly transfer the data to the data bus.

[Embodiment 2]

Figure 2:
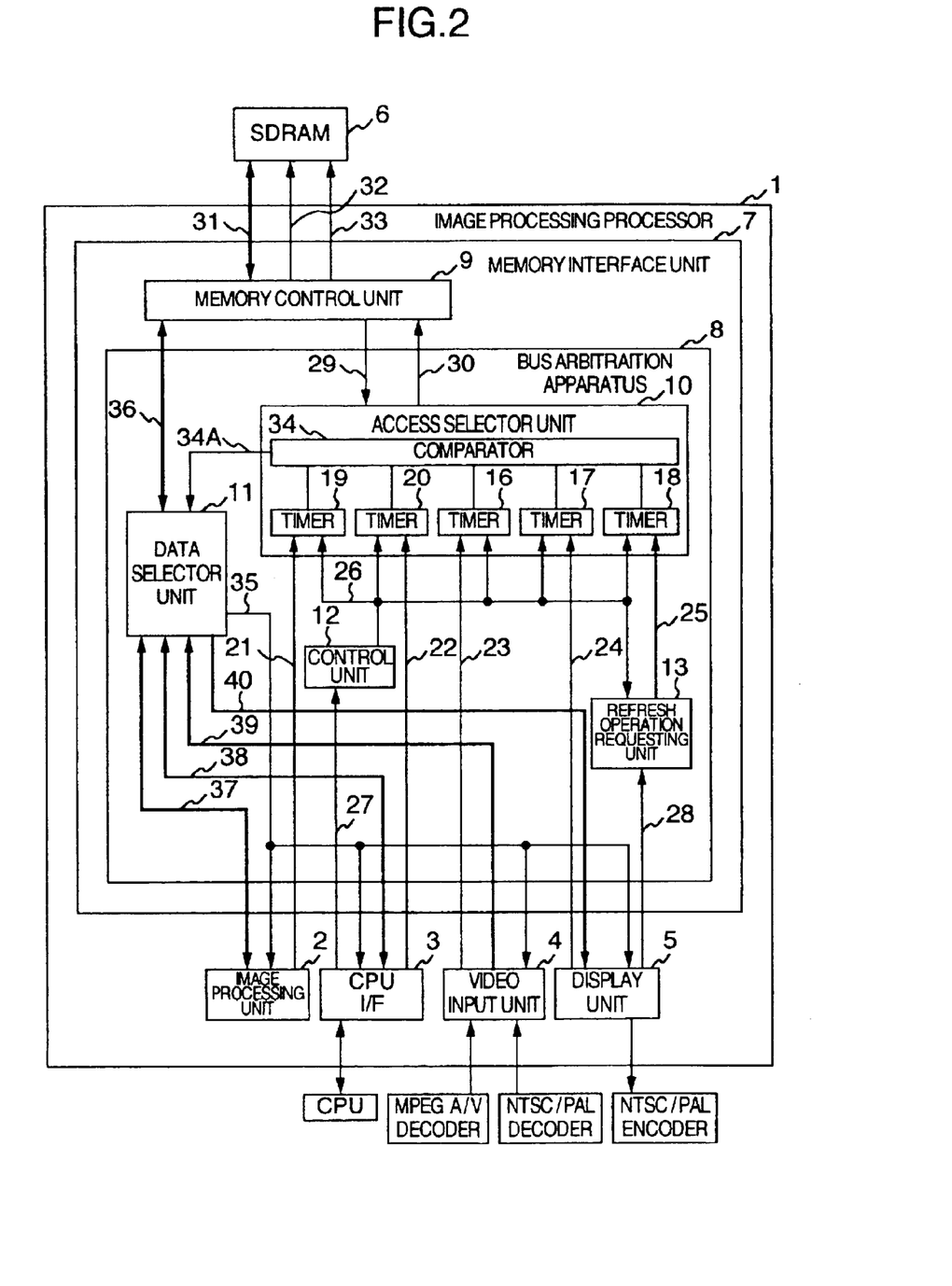
FIG. 2 is a schematic block diagram for representing a data processing processor according to another embodiment of the present invention.

FIG. 2 is a schematic block diagram for indicating a data processing processor according to another embodiment of the present invention, namely an image processing processor for processing image data. It should be noted that the same reference numerals shown in FIG. 1 will be employed as those for indicating the same, or similar structural components shown in FIG. 2, and detailed descriptions thereof are omitted. In other words, in the image processing processor of this embodiment 2, the following different technical point exists. That is, instead of the above-described registers, a timer 19 and another timer 20 are provided with respect to an image processing unit 2 and a CPU I/F unit 3, respectively.

When bus use request signals 21 and 22 are issued from the image processing unit 2 and CPU I/F 3, while such a value (namely, bus acquisition waiting permission time) set by the access frequent degree control signal 26 supplied from the control unit 12 is used as an initial value, both the timer 19 and the timer 20 start the count-down operations.

In the image data processing processor with the above-explained operations, the initial values of the timers 19 and 20 with respect to the channel (namely, CPU I/F unit, image processing unit) having the low necessity of the real-time processing operation are set to such values larger than the maximum value of the initial values of the timers 16, 17, 18 with respect to the channel having the high necessity of the real-time processing operation. Furthermore, the following function is employed in this image data processing data. That is, this function is capable of stopping the count-down operations of the timers 19 and 20 with respect to the channel having the low necessity of the real-time processing operation before the maximum initial value among the initial values of the timers 16, 17, 18 of the channel having the high necessity of the real-time processing operation.

To realize this function, the image data processing processor may be configured such that, for example, the maximum value among the initial values of the timers 16, 17, 18 of the channel having the high necessity of the real-time processing operation is compared with the count values of the timers 19 and 20 of the channel having the low necessity of the real-time processing operation every clock.

Since the image data processing processor is constituted by employing the above-described configuration, while the channel having the high necessity of the real-time processing operation issues the bus use request, the image data processing processor can be operated in such a manner that the bus arbitration apparatus 8 does not allow the channel having the low necessity of the real-time processing operation to use the bus.

While the data processing possessors according to various embodiments of the present invention have been described in detail, the present invention is not limited to the above-explained embodiments, but may be modified, changed, or substituted without departing from the technical scope and spirit of the present invention. For instance, in the above-explained embodiments, the count-down timers are employed in the data processing processor. Alternatively, even when such a count-up timer is employed, a similar bus arbitration operation may be carried out. Also, while the image processing processors are exemplified, the bus arbitrations are carried out as to such a case that there are differences in the high/low necessities of the real-time processing operations. Alternatively, as apparent from the foregoing descriptions, the inventive idea of the present invention may be similarly applied to such a bus arbitration apparatus in a data processing processor in the case that there is a difference in priority orders of data processing operations.

As apparent from the above-explained embodiments, in accordance with the data processing processors of the present invention, while the channel having either the high necessity or the high priority order of the real-time processing operation issues the bus use request, the bus arbitration apparatus does not allow the channel having either the low-necessity or the low priority order of the real-time processing operation to use the bus. Also, since the initial values of the timers and also the initial values of the registers can be arbitrarily changed, the priority order of the data transfer operation can be readily changed.

What is claimed is:

1. A data processor formed on a semiconductor substrate which is connectable to a synchronous memory, comprising:
   a data processing unit;
   a display unit;
   an image input unit;
   each of the units having a priority order which indicates a memory access priority order, a plurality of registers, and at least one of which stores an initial set value according to the priority order;

a control unit controlling arbitration to access to the synchronous memory, and allowing to one of the data processing unit, display unit and image input unit access to the synchronous memory; and a plurality of timer units which are set at a initial set value according to the priority order, wherein each of the data processing unit, display unit, and image input unit provides an access request to the control unit to access the synchronous memory, wherein the control unit allows one of the units which provide access requests to access the synchronous memory according to the value of the timer unit.

2. The data processor according to claim 1, wherein the timer units perform a count-down operation, wherein one timer unit starts the count-down operation, when the control unit receives the access request corresponding to the units accessing the synchronous memory, wherein the initial set value of a module having high priority order is smaller than the initial set value of a module having low priority order, and wherein the control unit allows, to the unit outputting the access request, access to the synchronous memory, when the timer unit of the unit outputting the access request has the low value.

3. The data processor according to claim 2, wherein the display unit has a high priority order, and the image input unit has a low priority order, and wherein the initial set value of the high priority order is smaller than that of the low priority order.

4. The data processor according to claim 1, wherein the data processing unit further comprises a memory interface unit operating to access the synchronous memory, and outputting the data signals, address signals and control signals, and inputting data signals to the synchronous memory, and wherein the memory interface unit controls access to the synchronous memory according to arbitration of the control unit.

* * * * *